US010876658B2

(12) United States Patent
Sixsmith

(10) Patent No.: US 10,876,658 B2
(45) Date of Patent: Dec. 29, 2020

(54) VALVE SUPPORT APPARATUS

(71) Applicant: Georg Fischer, LLC, Irvine, CA (US)

(72) Inventor: Thomas G. Sixsmith, Lake Forest, CA (US)

(73) Assignee: Georg Fischer LLC, Irvine, CA (US)

( * ) Notice: Subject to any disclaimer, the term of this patent is extended or adjusted under 35 U.S.C. 154(b) by 85 days.

(21) Appl. No.: 15/719,403

(22) Filed: Sep. 28, 2017

(65) Prior Publication Data
US 2019/0093794 A1 Mar. 28, 2019

(51) Int. Cl.
| | |
|---|---|
| *F16L 3/00* | (2006.01) |
| *F16L 3/22* | (2006.01) |
| *F16L 19/025* | (2006.01) |
| *F16L 3/18* | (2006.01) |
| *F16K 27/00* | (2006.01) |
| *F16M 11/04* | (2006.01) |
| *F16L 3/24* | (2006.01) |
| *F16B 7/04* | (2006.01) |
| *F16B 7/18* | (2006.01) |
| *F16L 3/01* | (2006.01) |
| *F16L 51/00* | (2006.01) |

(52) U.S. Cl.
CPC ............ *F16L 3/222* (2013.01); *F16B 7/0473* (2013.01); *F16K 27/003* (2013.01); *F16L 3/18* (2013.01); *F16L 3/24* (2013.01); *F16L 3/243* (2019.08); *F16L 19/025* (2013.01); *F16M 11/04* (2013.01); *F16M 11/046* (2013.01); *F16B 7/187* (2013.01); *F16L 3/01* (2013.01); *F16L 51/00* (2013.01)

(58) Field of Classification Search
CPC ......................... A62B 35/0062; E04G 21/3295
USPC ...... 248/58, 61, 317, 323, 339, 340, 220.21, 248/220.22, 225.11; 182/3, 12, 36, 113
See application file for complete search history.

(56) References Cited

U.S. PATENT DOCUMENTS

| | | | |
|---|---|---|---|
| 8,740,173 B2 | 6/2014 | Hagihara | |
| 8,794,205 B2 | 8/2014 | Nitz et al. | |
| (Continued) | | | |

FOREIGN PATENT DOCUMENTS

| | | |
|---|---|---|
| CN | 102444645 A | 5/2012 |
| CN | 203892312 U | 10/2014 |
| (Continued) | | |

*Primary Examiner* — Steven M Marsh
(74) *Attorney, Agent, or Firm* — Tsircou Law, P.C.

(57) ABSTRACT

A valve support apparatus is disclosed as capable of shifting a valve in a piping system in accordance with the thermal expansion of connected piping. The apparatus includes a valve mount, a slide mount, and a base, wherein the valve mount contains a valve attachment assembly to attach a valve. The valve mount can couple with the slide mount, using a mounting assembly, such that the valve mount is vertically and laterally secured about the slide mount, but the valve mount can move along the longitudinal axis of the slide mount. The slide mount, using another mounting assembly, can couple with the base, such that the slide mount is vertically and laterally secured about the base, but the slide mount can move along the longitudinal axis of the base, which is oriented orthogonally to the longitudinal axis of the slide mount. With this configuration, the stress and other loads exerted on the valve due to thermal expansion can be minimized by allowing the valve to be moved to account for the elongated piping.

13 Claims, 5 Drawing Sheets

(56) References Cited

U.S. PATENT DOCUMENTS

| | | | | |
|---|---|---|---|---|
| 9,038,344 | B2* | 5/2015 | Mayer | E04B 9/247 |
| | | | | 52/506.05 |
| 9,147,986 | B2* | 9/2015 | Redel | F24S 25/65 |
| 9,422,957 | B2* | 8/2016 | Dinh | F16B 5/0072 |
| 9,444,241 | B2* | 9/2016 | Chen | H02G 11/00 |
| 2009/0129885 | A1* | 5/2009 | Csik | F16B 37/046 |
| | | | | 411/103 |
| 2011/0024560 | A1* | 2/2011 | Horst | B64D 11/00 |
| | | | | 244/118.5 |
| 2018/0345057 | A1* | 12/2018 | Ecker | A62B 35/0062 |

FOREIGN PATENT DOCUMENTS

| | | |
|---|---|---|
| CN | 204226719 U | 3/2015 |
| DE | 3406955 A1 | 9/1984 |
| DE | 4328104 C1 | 2/1995 |
| DE | 4435556 C1 | 8/1995 |
| DE | 19961004 A1 | 7/2001 |
| EP | 0337414 A1 | 10/1989 |
| EP | 0456851 A1 | 11/1991 |
| EP | 0627586 B1 | 9/1996 |
| EP | 0773397 A1 | 5/1997 |
| FR | 2843765 A1 | 2/2004 |
| JP | 2015034608 A | 2/2015 |
| JP | 05878289 B2 | 3/2016 |

\* cited by examiner

VALVE SUPPORT APPARATUS

FIELD OF THE INVENTION

The present invention relates generally to piping systems with valves, more particularly, to a piping and valve system configured to adjust for thermal expansion and other factors.

BACKGROUND OF THE INVENTION

The use of piping has long been an effective and efficient means to transport fluid from one location to the next. Piping fittings, including valves, help direct the flow, and control characteristics of the fluid, such as pressure and flow rate. Valves, in particular, are crucial to piping design as they not only help regulate the transported fluid, but also can act as a protective measure to ensure the piping, equipment, and/or downstream receiver does not receive fluid at a condition, such as pressure, that is beyond its design capability.

There are many types of material that a piping system can be constructed from, such as wood, steel, and copper. Plastic piping, including PVC piping, are generally used for water and water based fluids, and provide several advantages over other materials, such as being lightweight, flexible, and resistant to corrosion.

However, plastic piping is generally more susceptible to temperature variation, particularly heat, due to its higher rate of thermal expansion compared to other types of material. Transporting fluids that can vary in temperatures, or piping that is exposed to varying ambient temperatures, can affect the plastic properties. As the plastic is exposed to warmer temperatures, it will have the tendency to expand, while being exposed to cooler temperatures will cause the plastic to contract. Expansion, if not properly accounted for in the piping design, can cause stress on pipe joints that may lead to leaks over time. Contraction can also result in the development of tensile loads in the piping system. Moreover, other factors can place stress on piping systems, such as mechanical vibrations, building settling, operational variations, and others. Generally, such expansion and contraction for piping are accounted for by configuring supports and/or expansion loops to minimize the impact of stress on any joints.

Valves, however, require additional support than piping given their additional weight and actuation issues. Currently, valves and the associated components are typically rigidly supported, creating a point of potential stress due to thermal expansion. The valves must rely on appropriate piping configuration to account for thermal expansion and other variations. This may however not minimize the stress and other loads exerted on the valve connections, thereby making this crucial fitting susceptible to failure or leaks over time.

Therefore, it should be appreciated that there remains a need to provide a dedicated means of reducing stress and other loads to valves and its components due to thermal expansion and other variations.

SUMMARY OF THE INVENTION

Briefly, and in general terms, the present invention provides a valve support apparatus designed to minimize the stress and other loads exerted on a valve due to the thermal expansion of the connected piping and other variations. The apparatus includes a valve mount that detachably secures a valve. The valve mount slidably couples to a support mount, such that the valve mount can move along the longitudinal axis ($L_m$) of the slide mount. The slide mount may further contain another mounting assembly that can couple with a base, wherein the slide mount optionally can move along the longitudinal axis ($L_b$) of the base, which is orthogonal to the longitudinal axis ($L_m$) of the slide mount. Thus, the valve can be moved in orthogonal directions to lessen the stress and load due to piping thermal expansion and other variations.

More specifically, in an exemplary embodiment, the valve mount defines a passageway that conformably receives a rail of the slide mount, thereby securing the valve mount to the slide mount vertically and laterally, while enabling the valve mount to move along the longitudinal axis ($L_m$) of the slide mount.

In another detailed aspect of an exemplary embodiment, the valve mount may detachably house a valve on the upper surface of the valve mount, using fasteners to secure to the bottom of a valve such that the valve flow axis ($L_f$) is aligned with the longitudinal axis ($L_m$) of the slide mount.

In yet another detailed aspect of an exemplary embodiment, the base is a U-shaped strut (uni-strut). The slide mount includes a mounting assembly including a counter sunk screw and steel plate, can secure the slide mount vertically and laterally to the base. The steel plate, in contact with the base, will however allow the slide mount to move along the longitudinal axis ($L_b$) of the base.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
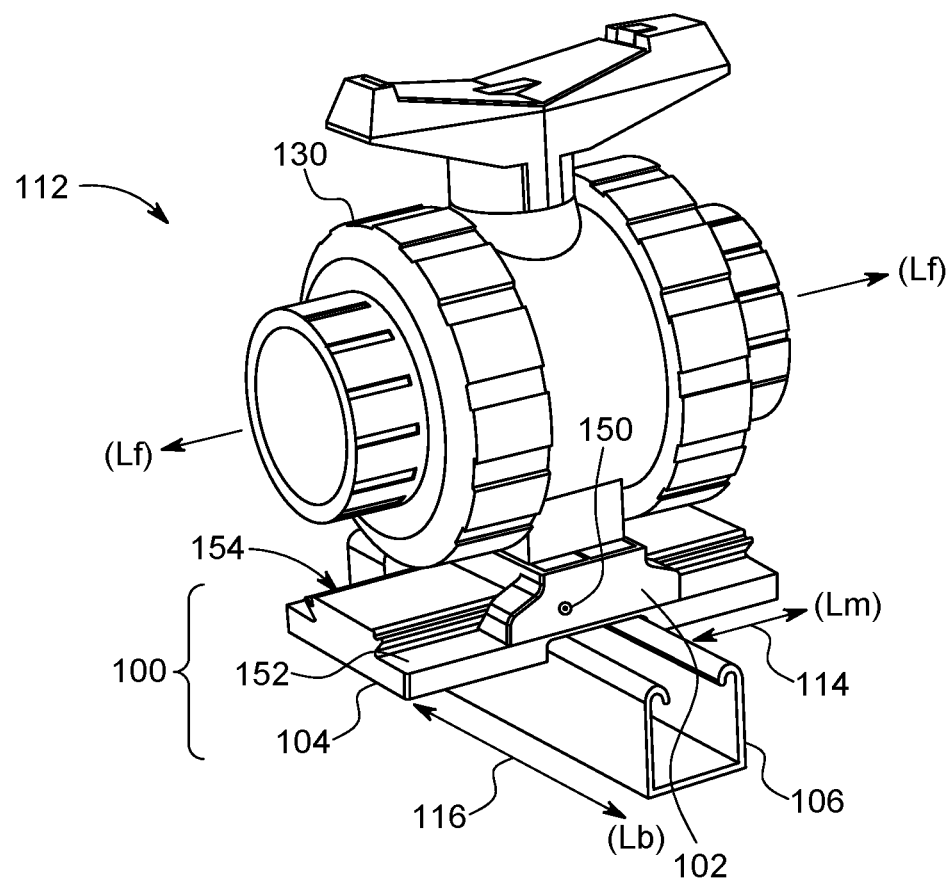
FIG. 1 is a front-side perspective view of a valve support apparatus in accordance with the present invention, depicting the valve support apparatus having a valve attached thereto.

Referring now to the drawings, and particularly FIG. 1, there is shown a valve support apparatus 100 having a valve mount 102, a slide mount 104, and a base 106. The valve mount 102 detachably secures a valve 130, and slidably couples to the slide mount, such that the valve mount 102 can move along a longitudinal axis (Lm) of the slide mount 104. The slide mount 104 couples to the base 106, in a manner that, at the assembler's discretion, the slide mount can move along the longitudinal axis (Lb) of the base, which is orthogonal to the longitudinal axis (Lm) of the slide mount. Thus, the valve 130 can be moved in orthogonal directions to lessen the stress and load due to piping thermal expansion and other variations.

In the exemplary embodiment, the valve mount 102 is configured with a valve attachment assembly 108 located on the upper surface. In the exemplary embodiment, screws are used to secure the valve to the valve mount. In other embodiment, various other attachment means can be used. Moreover, the valve 130 is coupled to the valve mount 102 such that a flow axis (Lf) of the valve is aligned with the longitudinal axis (Lm). The valve mount 102 also contains a first mounting assembly 110, defined on a bottom side thereof to couple the valve mount to the slide mount.

Figure 2A:
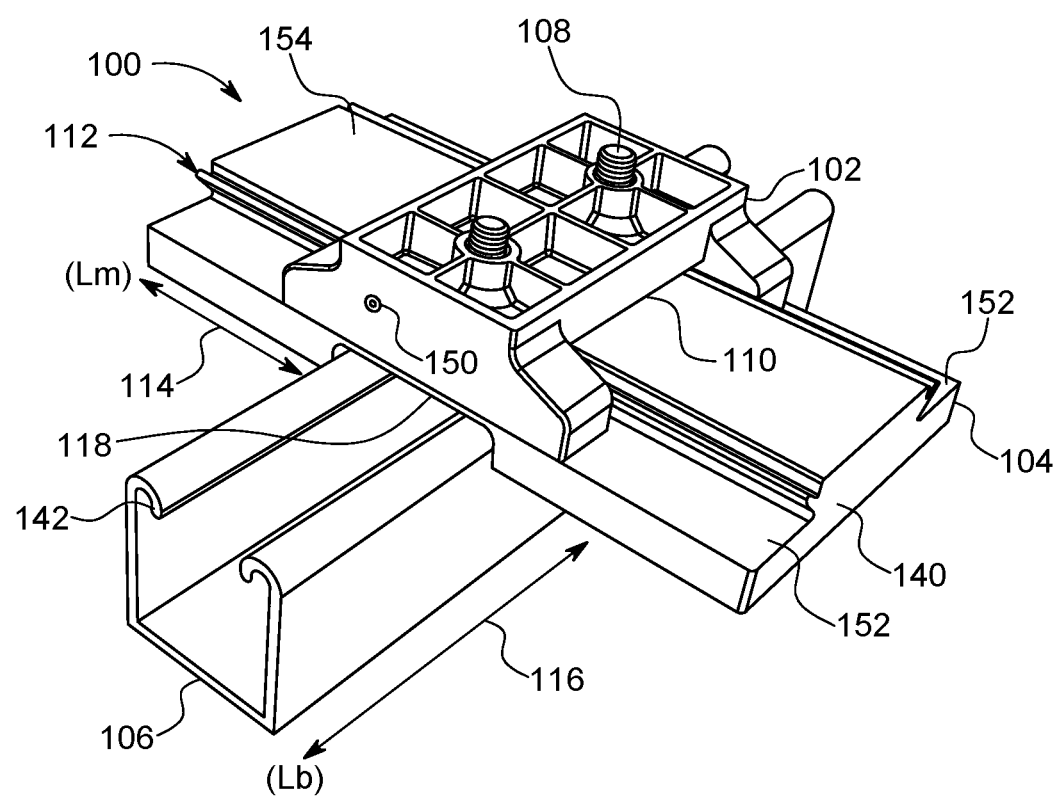
FIG. 2A is a front-side perspective view of the valve support apparatus of FIG. 1, depicting a valve mount coupled to a slide mount, and the slide mount coupled to a base.
Figure 2B:
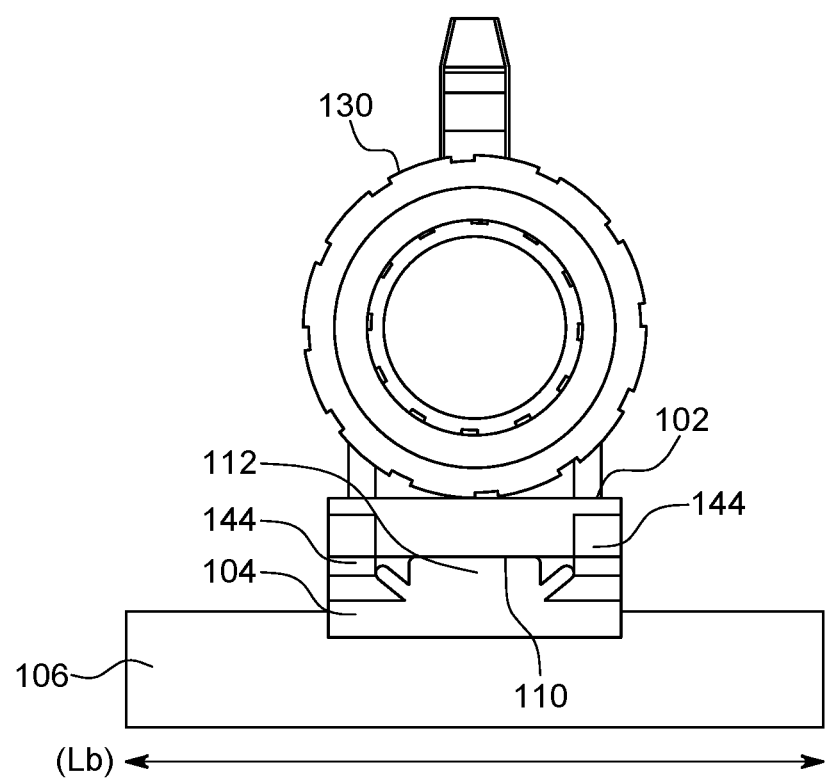
FIG. 2B is a front view of the valve support apparatus of FIG. 1, depicting a valve mount coupled to a slide mount, and the slide mount coupled to a base.

With reference to FIGS. 2A and 2B, the slide mount 104 includes a second mounting assembly 112 on an upper side thereof, which is elongated about the slide mount longitudinal axis (Lm) 114. The second mounting assembly 112 is configured to be coupled with the valve mount mounting assembly 110 by being inserted through the hollow passageway within the valve mount 102, entering through the first opening and exiting through the second opening. The valve mount 102 is thereby secured about the slide mount 104 from vertical or lateral movement, but can be moved along the longitudinal axis (Lm) 114 between the opposing ends of the upper layer. Thus, as the piping connected to a given valve expands due to temperature variation, the valve mount 102 can move accordingly to accommodate piping elongation, minimizing stress and other loads exerted on the valve. In selected embodiments, the slide mount 104 can further includes calibration markings, e.g., (inch or metric), to denote displacement of the valve mount 102 along the slide mount 104 relative to a prescribed location thereon.

In the exemplary embodiment, the first mounting assembly 110 of the valve mount 102 include flanges 144 that project downwardly, to couple about the second mounting assembly 112 of the slide mount 104. More particularly, the second mounting assembly is configured as a rail that has a tapered cross-section, in which the cross section is wider at the distal portion, relative to a proximate portion of the rail. The flanges of the first mounting assembly 110 project on opposing sides of the rail 112. The flanges cooperate with the tapered rail 112 to inhibit vertical displacement of the valve mount relative to the slide mount, while enabling freedom of movement confined along longitudinal axis (Lm). The flanges define a passageway on the bottom sides of the valve mount body with a first opening and second opening on opposing ends.

The upper side of the slide mount 104 includes a top surface 154 of the rail 112 and outer surfaces 152 disposed on opposing sides of the rail 112. The valve mount 102 is sized such that the flanges 144 are in proximity to the outer surfaces such that the outer surface tend to be weight bearing as opposed to the top surface 154, which can facilitate longer life span of the assembly smooth travel along the slide mount.

In the exemplary embodiment, the valve mount 102 is formed of polypropylene, and the slide mount 104 is formed of a glass-filled polypropylene. In other embodiment, the valve mount and the slide can be formed of different materials so long as the valve mount to slide can along the slide mount.

The slide mount 104 can further include mechanical stops (not shown) disposed at opposing ends thereof. The stops are configured to retain the valve mount along the confines of slide mount. More particularly, in the exemplary embodiment, the second mounting assembly defines a rail for securing the first mounting assembly 110 of the valve mount 102.

The plate 122 further includes grooves 126 that secure to U-shaped strut ends 128 of the base (unistrut) 124, which allows for the slide mount 104 and steel plate 122 to move along the longitudinal axis (Lb) 116 of the base, as depicted in FIG. 1, which is perpendicular to the movement 114 of the valve mount. The base 124 can further includes stops 142 disposed at opposing ends thereof, to retain the slide mount along the confines of the base. In an alternate embodiment, the base may be a flat surface (not shown) wherein the slide mount is affixed to the flat surface without the capability of moving in any direction. In this alternate embodiment, only the valve mount is movable about the longitudinal axis (Lm) 114 of the slide mount.

Figure 3A:
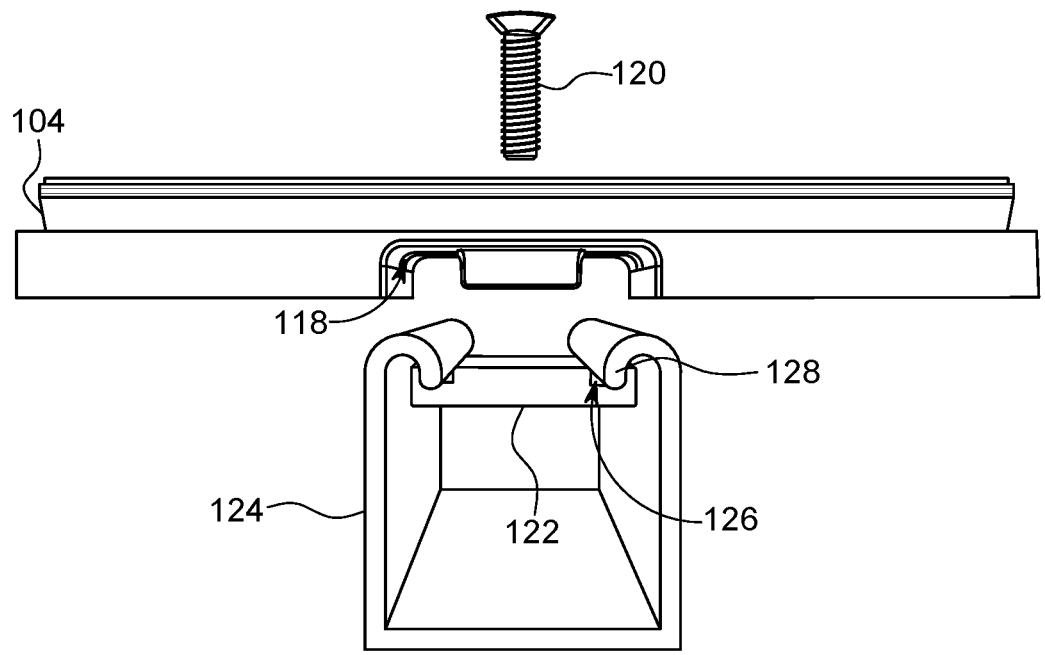
FIGS. 3A is front perspective view of the valve support apparatus of FIG. 1, depicting the longitudinal ($L_m$) side of the slide mount, the base, a counter sunk screw, and steel plate, prior to prior to attachment.
Figure 3B:
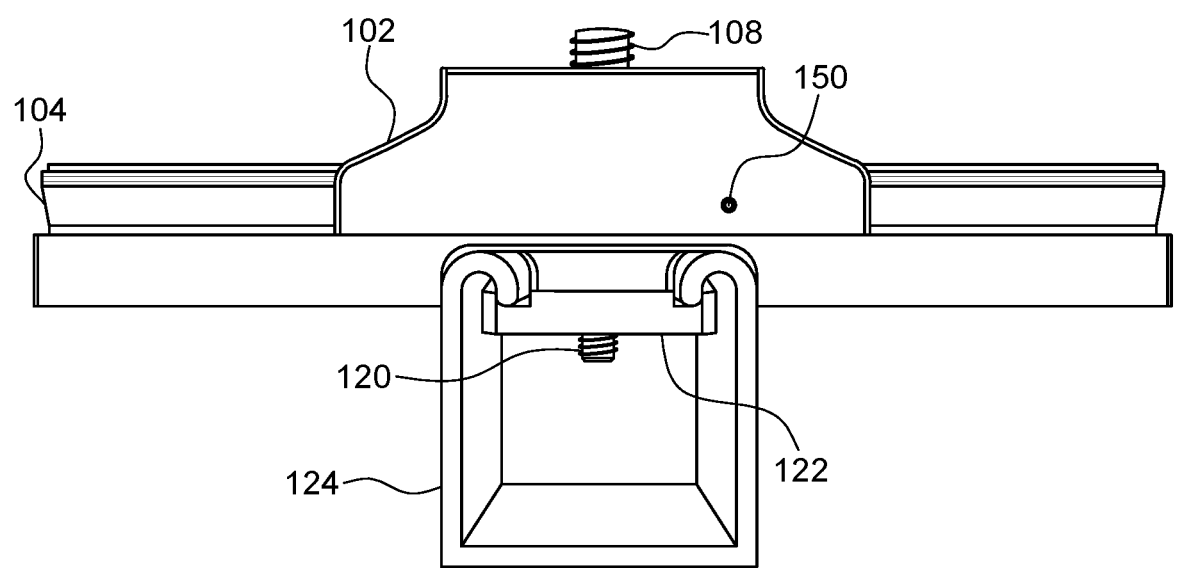
FIG. 3B front perspective view of the valve support apparatus of FIG. 1, similar to FIG. 3A, depicting the attached components along with an attached valve mount.

With reference to FIGS. 3A and 3B, there is shown a third mounting assembly 118 on the slide mount 104, configured to attach with the base 106. In the exemplary embodiment, the longitudinal axis (Lm) 114 of a third mounting assembly 118 on the slide mount 104 is configured to affix orthogonally relative to the longitudinal axis (Lb) 116 of a base 106. The third mounting assembly 118 further includes a counter sunk screw 120 and steel plate 122 that couples the slide mount 104 with a U-shaped strut base (uni-strut) 124, thereby securing the slide mount 104 from vertical or lateral movement about the U-shaped strut base 124, as depicted in FIG. 3B. The third mounting assembly can be adjustably set so that either the slide mount 104 is fixed in place to the strut 124 or that slide mount can slide along the longitudinal axis (Lb) of the base, depending on how securely tightened the screw 120 is set. In other embodiments, the third mounting assembly can utilize other attachment methods for securing the slide mount to the base.

Referring again to FIG. 1, the valve 130 can be attached through a variety of fastening mechanisms, including, but not limited to the use of pan head screws. As aforementioned, the valve 130, attached to the valve mount 102, can be moved about the longitudinal axis (Lm) 114 of the slide mount 104, and/or the valve can be moved about the longitudinal axis (Lm) 116 of the base 106, which is perpendicular to the longitudinal axis (Lm) 114 of the slide mount. Thus, if pipe elongation occurs on both sides of the valve, potentially restricting the ability to move about the longitudinal axis (Lm) 114 of the slide mount, movement about the longitudinal axis ($L_b$) 116 base may help alleviate stress build-up by allowing the pipes to move accordingly. The valve mount 102 further defines one or more hole(s) 150 along the sidewall thereof, which serves to drain any fluid that might collect in the valve mount.

Figure 4:
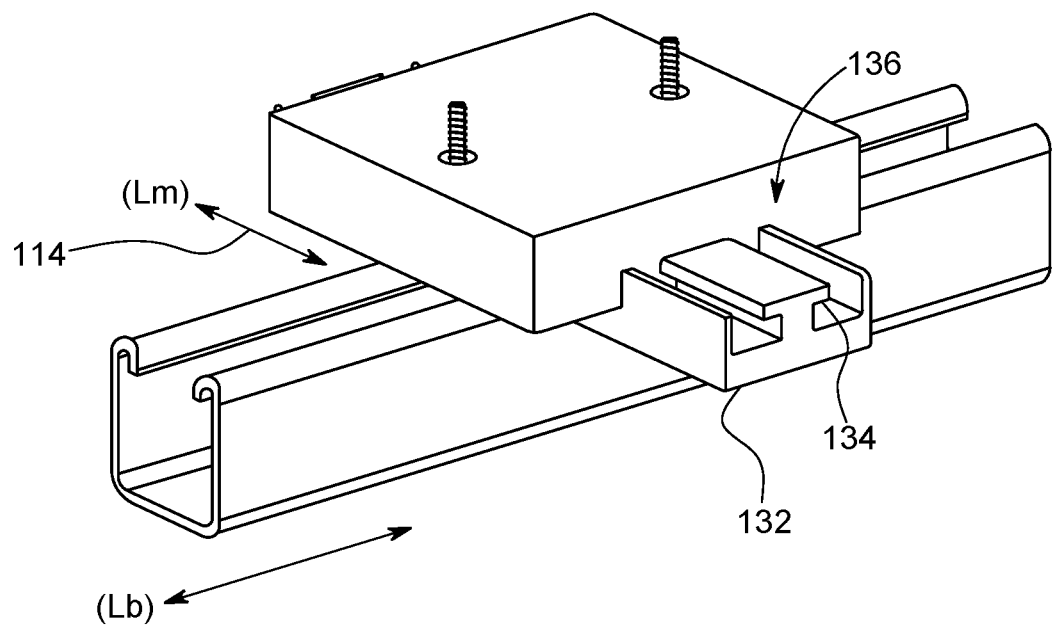
FIG. 4 is a side perspective of an alternate embodiment of a valve support apparatus in accordance with the present invention, depicting a valve mount with a valve attachment assembly and mounting assembly, a slide mount with an inverted groove mounting assembly for attachment with the valve mount, and another mounting assembly for attachment with a base.

Referring now to FIG. 4, in an alternate embodiment, the slide mount 132 mounting assembly is configured with inverted grooves 134, wherein the mounting assembly of the valve mount 136 is configured to be flush together with the slide mount 132. The flushed contact between the inverted grooves 134 on the slide mount 132 and the valve mount 136 provide for vertical and lateral stability, while allowing the valve mount 136 to move along the longitudinal axis ($L_m$) 114 of the slide mount 132.

It should be appreciated from the foregoing that the present invention provides a valve support apparatus that can minimize the stress and other loads exerted on a valve in piping systems due to thermal expansion by allowing the valve the freedom to move. The apparatus includes a valve mount that detachably houses a valve, wherein the valve mount can couple with a slide mount such that, the valve mount is secured vertically and laterally, but can move along the longitudinal axis ($L_m$) of the slide mount. The slide mount can include a mounting assembly to couple with a base, wherein the slide mount is secured vertically and laterally, but can move along the longitudinal axis ($L_m$) of the base, which is oriented orthogonally with the longitudinal axis ($L_m$) of the slide mount. Thus, the valve can move in response to pipe expansion to alleviate stress build-up.

The present invention has been described above in terms of presently preferred embodiments so that an understanding of the present invention can be conveyed. However, there are other embodiments not specifically described herein for which the present invention is applicable. Therefore, the present invention should not be seen as limited to the forms shown, which is to be considered illustrative rather than restrictive.

What is claimed is:

1. A valve support apparatus for piping systems, comprising:
    a valve mount having a valve attachment assembly on an upper surface of the valve mount for affixing a valve assembly having a flow axis ($L_f$), the valve mount having a pair of flanges that project downwardly and that are spaced apart from each other;
    a base that defines a longitudinal axis ($L_b$), disposed below the valve mount oriented such that the flow axis ($L_f$) and the longitudinal axis ($L_b$) are perpendicular; and
    a slide mount that defines a longitudinal axis ($L_m$) aligned with the flow axis ($L_f$), the slide mount having an upper side coupled to the valve mount and a lower side coupled to the base, such that the side mount is disposed between the valve mount and the base,
        an upstanding rail disposed on an upper side thereof, aligned with the longitudinal axis ($L_m$), the rail having a tapered cross-section, the pair of flanges of the valve mount are disposed on opposing sides of the rail from one another, such that the pair of flanges cooperate with the rail to inhibit vertical displacement of the valve mount relative to the slide mount, while enabling freedom of movement confined along longitudinal axis ($L_m$),
        a pair of outer surface sections on opposing sides of the rail aligned with the longitudinal axis ($L_m$), disposed below the pair of flanges to support a weight thereof, and
        a mounting assembly disposed on the lower side of the slide mount, that couples the slide mount to the base such that the slide mount can be moved along the longitudinal axis ($L_b$) of the base.

2. The valve support apparatus as defined in claim 1, the mounting assembly includes a plate that secures to the base and an attachment mechanism that connects the plate to the lower side of the slide mount.

3. The valve support apparatus as defined in claim 1, the base has a u-shaped cross-section.

4. The valve support apparatus as defined in claim 1, the rail has a tapered cross-section, in which the cross section is wider at a distal portion, relative to a proximate portion of the rail.

5. The valve support apparatus as defined in claim 1, the slide mount further includes stops disposed at opposing ends thereof to retain the valve mount along the confines of the slide mount.

6. The valve support apparatus as defined in claim 1, the valve mount defines a passageway on the bottom side thereof, disposed about the rail, such that the outer surface sections of the slide mount are weight bearing as opposed to a top surface of the rail.

7. The valve support apparatus as defined in claim 1, wherein the base is an elongated U-shaped strut.

8. The valve support apparatus as defined in claim 7, wherein the base further includes stops disposed at opposing ends thereof to retain the slide mount along the base.

9. A valve support apparatus for piping systems, comprising:
    a valve mount having a valve attachment assembly on an upper surface of the valve mount for affixing a valve assembly having a flow axis ($L_f$), the valve mount having a pair of flanges that project downwardly and that are spaced apart from each other; and
    a slide mount that defines a longitudinal axis ($L_m$) aligned with the flow axis ($L_f$), the slide mount having an upper side coupled to the valve mount and a lower side coupled to an elongated u-shaped base that defines a longitudinal axis ($L_b$), such that the slide mount is disposed between the valve mount and the base,
        an upstanding rail disposed on an upper side thereof, aligned with the longitudinal axis ($L_m$), the rail having a tapered cross-section the pair of flanges of the valve mount are disposed on opposing sides of the rail from one another, such that the pair of flanges cooperate with the rail to inhibit vertical displacement of the valve mount relative to the slide mount, while enabling freedom of movement confined along longitudinal axis ($L_m$),
        a pair of outer surface sections on opposing sides of the rail aligned with the longitudinal axis ($L_m$), disposed below the pair of flanges to support a weight thereof
        a slide mounting assembly disposed on the lower side of the slide mount, that couples the slide mount to the base such that the slide mount can be moved along the longitudinal axis ($L_b$) of the base.

10. The valve support apparatus as defined in claim 9, the valve mount defines a passageway on the bottom side thereof, disposed about the rail, such that the outer surface sections of the slide mount are weight bearing as opposed to a top surface of the rail.

11. The valve support apparatus as defined in claim 9, the rail has a tapered cross-section, in which the cross section is wider at a distal portion, relative to a proximate portion of the rail.

12. The valve support apparatus as defined in claim 9, the slide mount further includes stops disposed at opposing ends thereof to retain the valve mount along the slide mount.

13. The valve support apparatus as defined in claim 9, the slide mounting assembly includes a plate that secures to the base and an attachment mechanism that connects the plate to the lower side of the slide mount.

\* \* \* \* \*